United States Patent
Kogure et al.

(10) Patent No.: US 7,645,938 B2
(45) Date of Patent: Jan. 12, 2010

(54) WIRING HARNESS FASTENING DEVICE FOR ELECTRIC SUPPLY LINE OF SLIDING DOOR AND ELECTRIC SUPPLY SYSTEM UTILIZING THE SAME

(75) Inventors: Naoto Kogure, Shizuoka (JP); Hiroshi Sanada, Kanagawa (JP)

(73) Assignee: Yazaki Corporation, Tokyo (JP)

( * ) Notice: Subject to any disclaimer, the term of this patent is extended or adjusted under 35 U.S.C. 154(b) by 250 days.

(21) Appl. No.: 10/548,876

(22) PCT Filed: Dec. 26, 2003

(86) PCT No.: PCT/JP03/16934

§ 371 (c)(1),
(2), (4) Date: Jun. 29, 2006

(87) PCT Pub. No.: WO2004/082090

PCT Pub. Date: Sep. 23, 2004

(65) Prior Publication Data

US 2007/0025061 A1 Feb. 1, 2007

(30) Foreign Application Priority Data

Mar. 14, 2003 (JP) ............................. 2003-069762

(51) Int. Cl.
*H02G 3/04* (2006.01)
*H01R 33/00* (2006.01)
*H02G 5/04* (2006.01)
*B60L 5/38* (2006.01)

(52) U.S. Cl. ..................... 174/72 A; 174/68.1; 439/34; 191/22 R

(58) Field of Classification Search ................ 174/68.1, 174/68.3, 69, 70 C, 71 R, 72 C, 72 A, 72 R, 174/97, 98, 99 R, 99 B, 99 E, 135; 403/122; 191/22 R, 23 R; 439/34, 111, 162, 207, 451, 439/503; 138/111, 157, 158, 166, 167, 168; 248/74.3, 68.1, 71

See application file for complete search history.

(56) References Cited

U.S. PATENT DOCUMENTS 1,724,815 A * 8/1929 Walter .......................... 174/86

(Continued)

FOREIGN PATENT DOCUMENTS

JP       2000-291626       10/2000

(Continued)

*Primary Examiner*—Diego Gutierrez
*Assistant Examiner*—David M Sinclair
(74) *Attorney, Agent, or Firm*—Kratz, Quintos & Hanson, LLP

(57) ABSTRACT

The present invention is to prevent twisting of a wiring harness when it is assembled to a vehicle. A wiring harness fastening device for an electric supply line of a sliding door includes a rotational portion having a spherical shape for fastening the wiring harness and a case having a spherical receiving space for rotatably holding the rotational portion, wherein the rotational portion has a protrusion at an outer surface thereof, wherein the receiving space has a rib, and wherein the protrusion abuts to the rib when the wiring harness is twisted. The rotational portion has a circular-shaped rib intersecting with the rib for holding the rotational portion slidably. The case has a wiring harness guide wall with a curved shape to lead out the wiring harness. The wiring harness abuts the wiring harness guide wall prior to the protrusion abuts the rib.

8 Claims, 4 Drawing Sheets

U.S. PATENT DOCUMENTS

| | | | |
|---|---|---|---|
| 5,132,492 A * | 7/1992 | Wieder | 174/535 |
| 6,213,674 B1 * | 4/2001 | Sasaki et al. | 403/122 |
| 6,595,473 B2 * | 7/2003 | Aoki et al. | 248/74.4 |
| 6,668,865 B2 * | 12/2003 | Miyamoto et al. | 138/108 |
| 6,818,827 B2 * | 11/2004 | Kato et al. | 174/72 A |
| 2003/0111579 A1 * | 6/2003 | Miyamoto et al. | 248/67.5 |
| 2003/0222183 A1 * | 12/2003 | Kato | 248/49 |

FOREIGN PATENT DOCUMENTS

| | | |
|---|---|---|
| JP | 2002-17031 | 1/2002 |
| JP | 2002-199558 | 7/2002 |

* cited by examiner

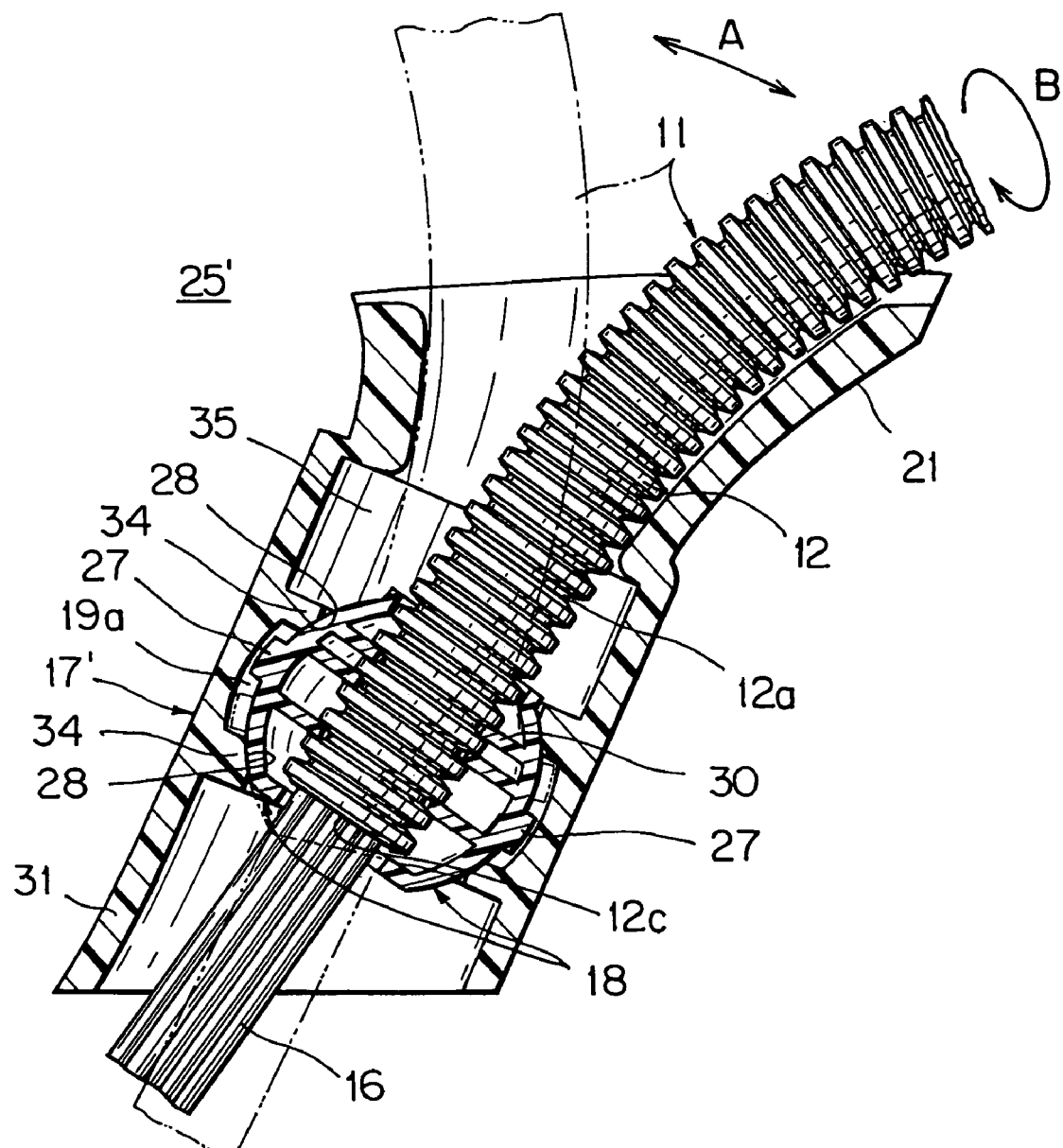
F I G. 3

WIRING HARNESS FASTENING DEVICE FOR ELECTRIC SUPPLY LINE OF SLIDING DOOR AND ELECTRIC SUPPLY SYSTEM UTILIZING THE SAME

TECHNICAL FIELD

The present invention relates to a wiring harness fastening device for an electric supply line of a sliding door of motor vehicles such as station wagons, and for absorbing twisting or winding of the wiring harness when the sliding door is closed and opened, and also relates to an electric supply system utilizing the same.

RELATED ART

As shown in FIG. 4, a wiring harness 70 with a plurality of electric wires is arranged from a body of a motor vehicle to a sliding door 71 to supply electric current or signal current to auxiliary units such as electric components in the sliding door. The wiring harness 70 is received in a protector 72, made of a synthetic resin, in the sliding door 71. An electric supply system for adjusting winding of the wiring harness 70 responding to the opening and closing of the sliding door 71 is disclosed, for example, JP-2001-354085-A.

The auxiliary units, such as power window motors, door locking units, switch units and opening and closing units for automatic doors, are arranged inside the sliding door.

The protector 72 has opposed walls 73, peripheral walls 74, and a slit-shaped opening 75 at a bottom thereof. The protector 72 is fixed to a door panel 76 made of a metal and covered with a door trim 77 made of a synthetic resin. The door trim 77 is fixed to the door panel 76 with bolts or clips 78. The wiring harness 70 is arranged from the protector 72 to the vehicle body and fixed with a wiring harness fastening device, not shown, in the vehicle body.

When the sliding door 71 is moved in a forward direction, or to the right in FIG. 4, and fully closed, the wiring harness 70 is pulled and stretched in the backward direction shown by dotted lines in FIG. 4. When the sliding door 71 is moved backward and fully opened, the wiring harness 70 is pulled in the forward direction and wound in a small diameter in the protector 72 as shown by solid lines. The wiring harness 70 is moved back and forth with respect to the harness fastening device fixed to the vehicle body by opening and closing the sliding door 71.

In the conventional electric supply system, the wiring harness is twisted and wound between the protector and the wiring harness fastening device when the sliding door is opened and closed so that the wiring harness decreases the endurance.

When the fastening device is assembled to the vehicle body and the wiring harness is twisted, the wiring harness further decreases the endurance when the sliding door is opened and closed.

The present invention is to provide a wiring harness fastening device for an electric supply line of a sliding door and an electric supply system utilizing it. The wiring harness fastening device prevents twisting of the wiring harness and decrease of endurance.

DISCLOSURE OF THE INVENTION

According to a first aspect of the invention, a wiring harness fastening device for an electric supply line of a sliding door has a rotational portion having a spherical shape for fastening the wiring harness, and a case having a circular-shaped receiving space for rotatably holding the rotational portion, wherein said rotational portion has a protrusion at an outer surface, wherein said receiving space has a rib, and wherein the protrusion abuts to the rib when the wiring harness is twisted.

Thereby, when the case is fixed to a vehicle body and the wiring harness is arranged from the wiring harness fastening device to the sliding door, the wiring harness can rotate in a circumferential direction of the wiring harness and wind up-and-down and right-and-left with the rotational portion. Accordingly, when the sliding door is opened and closed and the wiring harness swings, twists and winds, the rotational portion absorbs the twisting and winding of the wiring harness with the rotation and winding thereof. Excess twisting and winding force do not act to the wiring harness so that the endurance of the wiring harness becomes higher.

When the wiring harness fastening device is assembled to the vehicle body and the wiring harness is twisted, the protrusion of the rotational portion abuts to the rib of the case and prevents further twisting. When the wiring harness is further twisted while the protrusion abuts to the rib, a worker feels the reversed torsion of the wiring harness with his hand and adjusts the twisting when assembling so that the wiring harness after assembly does not have an excess torsion. When the sliding door is slammed after assembly, the protrusion abuts to the rib and prevents further twisting of the wiring harness.

According to a second aspect of the present invention, the wiring harness fastening device has a circular-shaped rib intersecting with the rib for slidably holding the rotational portion.

Thereby, the rotational portion can rotate smoothly in the case. Thus, when the wiring harness is assembled to the vehicle body, the rotational portion rotates smoothly to absorb the twisting of the wiring harness and assists the protrusion to abut the rib.

According to a third aspect of the present invention, the case has a wiring harness guide wall with a curved shape to lead out the wiring harness.

Thereby, when the sliding door is opened and closed, the wiring harness swings with the rotational portion and is wound along the wiring harness guide wall of the case so that the wiring harness is prevented from bending and the endurance thereof is improved.

According to a fourth aspect of the present invention, the wiring harness abuts the wiring harness guide wall prior to the protrusion abutting the rib.

Thereby, when the sliding door is opened and closed strongly, the protrusion of the rotational portion does not hit strongly the rib of the case so that the wear and damage with time of the protrusion and the rib are prevented.

According to a fifth aspect of the present invention, an electric supply unit includes the wiring harness fastening device, as described in any one of the aspects 1 to 4, installed in a vehicle body and a wiring harness protector attached to a sliding door, wherein said wiring harness held by the fastening device is arranged flexibly inside the sliding door through an elongated opening of the wiring harness protector.

Thereby, the wiring harness is arranged from the fastening device to the sliding door and can rotate in a circumferential direction thereof and wind up-and-down and right-and-left with the rotational portion. When the sliding door is opened and closed and the wiring harness swings, twists and winds, the rotational portion absorbs the twisting and winding of the wiring harness with the rotation and winding thereof. When the fastening device is assembled to the vehicle body and the wiring harness is twisted, the protrusion of the rotational portion abuts to the rib of the case and prevents further twisting. When the wiring harness is further twisted while the protrusion abuts to the rib, a worker feels the reversed torsion of the wiring harness with his hand and adjusts the twisting when assembling so that the wiring harness after assembly does not have an excess torsion. When the sliding door is slammed after assembly, the protrusion abuts to the rib and prevents further twisting of the wiring harness. Excess twisting and winding force do not act to the wiring harness so that the endurance of the wiring harness becomes higher.

BRIEF DESCRIPTION OF THE DRAWINGS

FIG. 3 is a horizontal sectional view of an assembly of a wiring harness fastening device for an electric supply line of a sliding door similar to the embodiment of FIG. 2.

BEST MODE FOR CARRYING OUT THE INVENTION

Figure 1:
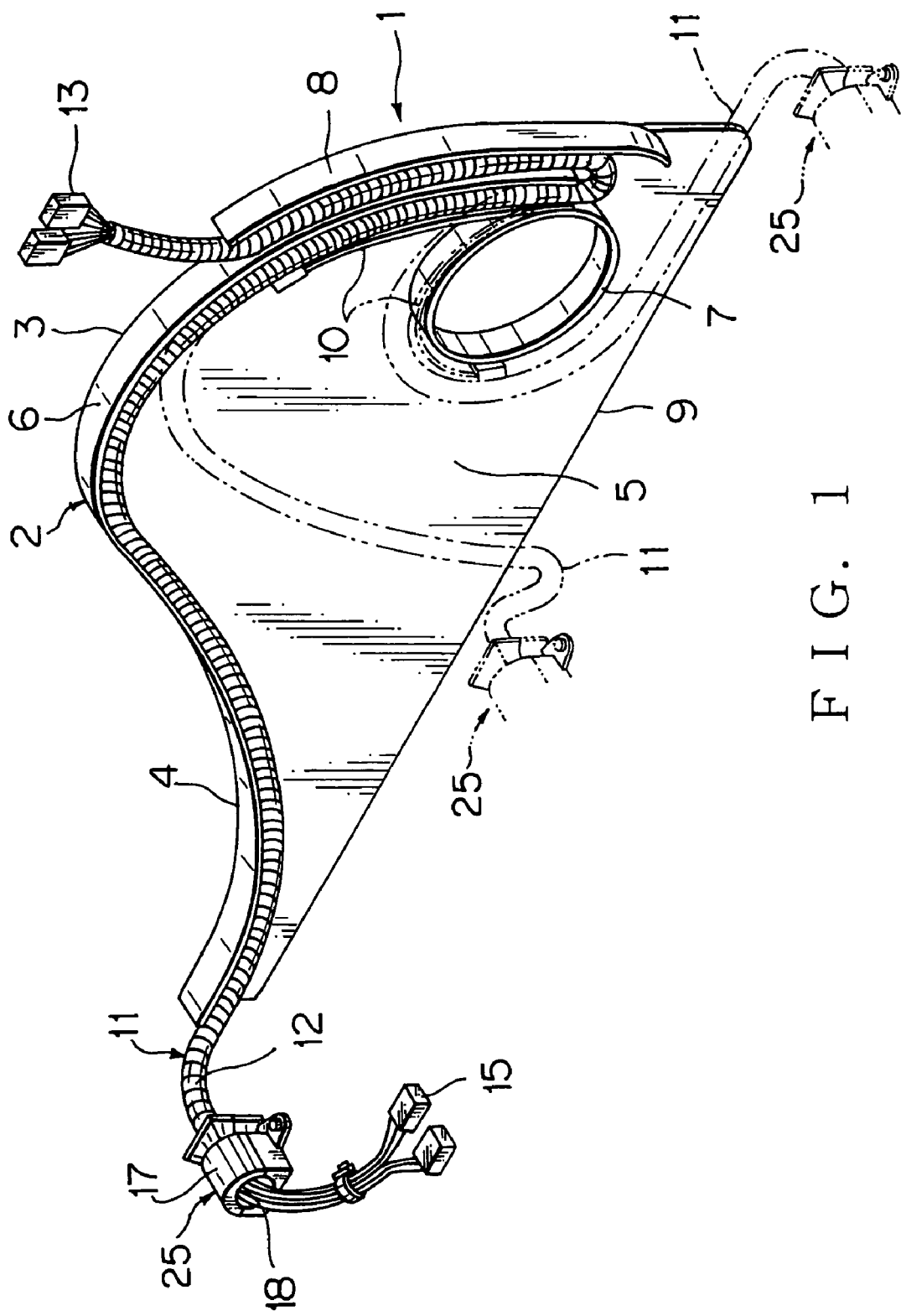
FIG. 1 is a perspective view showing an embodiment of an electric supply system utilizing a wiring harness fastening device of a sliding door according to the present invention.
Figure 2:
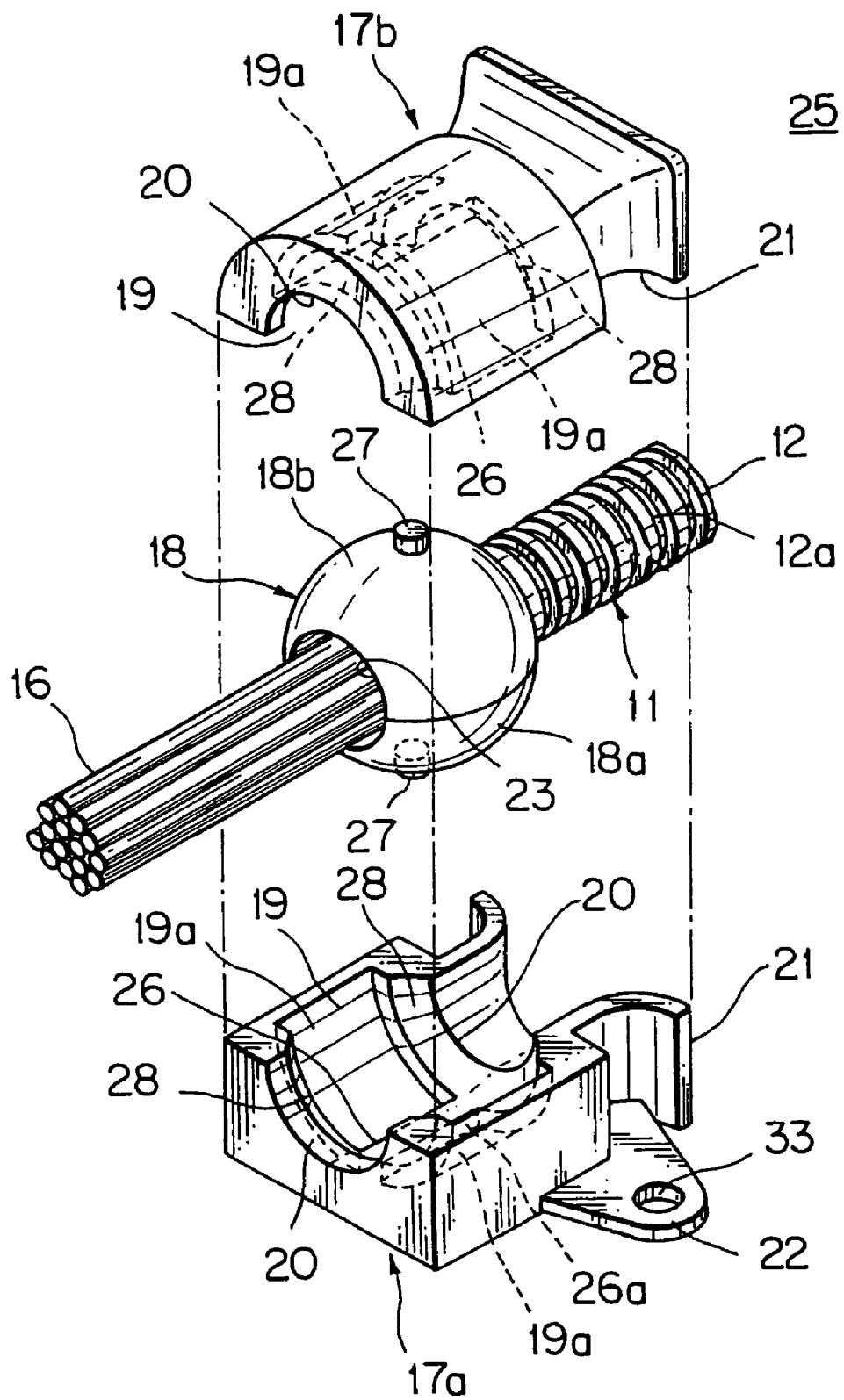
FIG. 2 is an exploded perspective view showing the embodiment of the wiring harness fastening device for an electric supply line of the sliding door.
Figure 4:
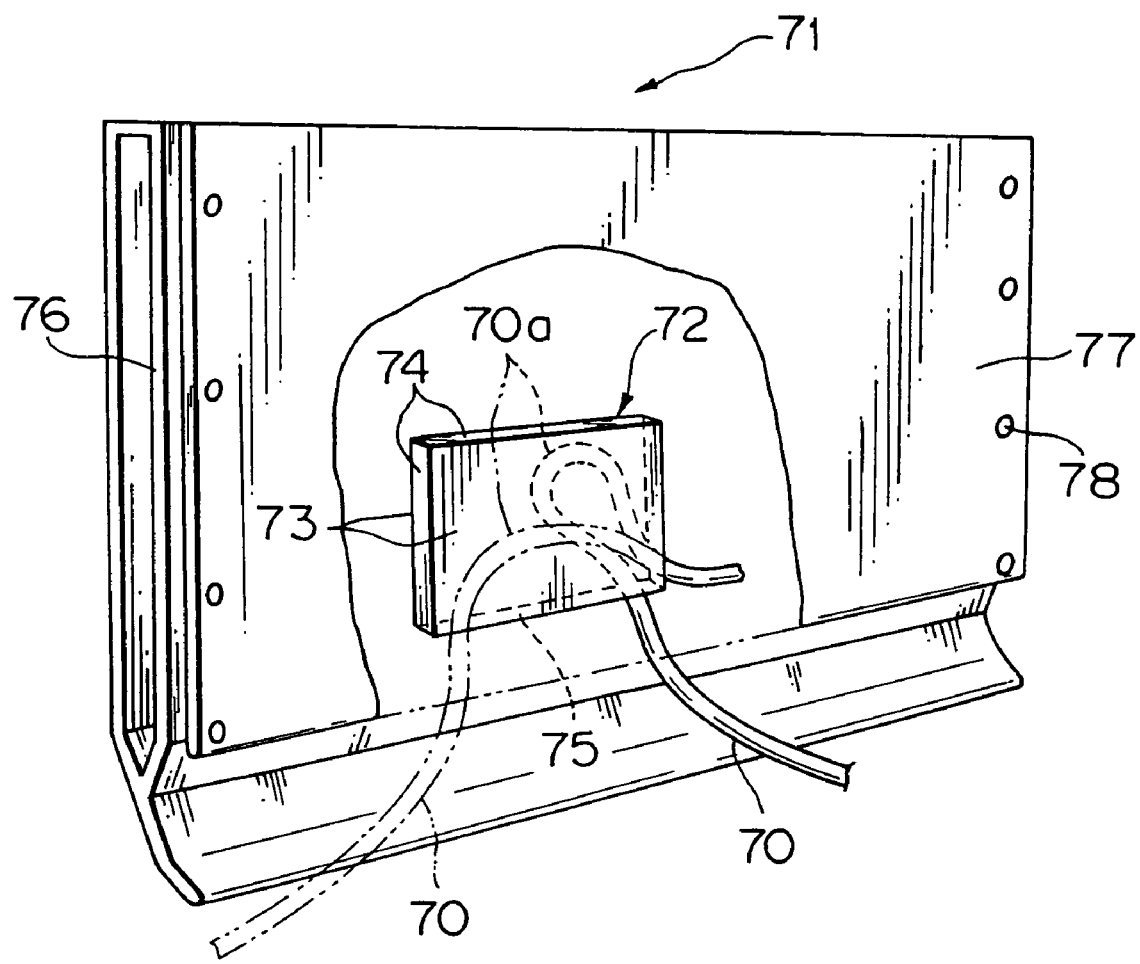
FIG. 4 is a perspective overview of an embodiment of a conventional electric supply system of a sliding door.

Embodiments of the present invention are explained by referring to drawings. FIG. 1 shows an embodiment of a electric supply system utilizing a wiring harness fastening device for a sliding door. FIG. 2 is an embodiment of the wiring harness fastening device.

A wiring harness protector 1, hereafter referred to protector, made of a synthetic resin, has a protector main body 2, a cover (not shown), a semicircular portion 3, and an extended portion 4 with a varying height following from the semicircular portion 3.

The protector main body 2 includes a vertical base plate 5, a curved wall 6, an annular regulating wall 7 disposed forward the base plate 5, and a upwardly curved wiring harness lead-out 8 disposed outside the curved wall 6. The protector main body 2 has an elongated opening 9 at a bottom thereof for leading out the wiring harness. The cover, not shown, is fixed to the protector main body 2 with locking means such as flexible locking claws or holes, not shown.

A resilient leaf spring 10 made of a metal is disposed upwardly at the annular regulating wall 7 in a tangential projection. The wiring harness 11 is arranged along the leaf spring 10. When the wiring harness 11 is received in the protector 1 and covered with a cover (not shown), it is wound and urged upwardly with the leaf spring 10.

The wiring harness 11 is covered with a corrugated tube 12 made of a synthetic resin. One end of the wiring harness 11 is led to outside through the forward lead-out 8 and the other end led to outside through the lower opening 9. The one end of the wiring harness 11 is connected to a wiring harness, not shown, of a sliding door through a connector 13 and connected to auxiliary units. The other end of the wiring harness is connected to a wiring harness, not shown, of a vehicle body through a connector 15 and rotatably supported by a wiring harness fastening device 25.

The wiring harness 11 has a plurality of electric wires 16, see FIG. 2, and the corrugated tube 12 which keeps flexibility of the wiring harness 11 and protects the electric wires 16 from outer influences.

As shown in FIG. 2, the wiring harness fastening device 25 includes a case 17, or cases 17a and 17b, made of a synthetic resin and a rotational portion 18 having a spherical shape in the case 17. The spherical rotational portion 18 can rotate in any directions in the case 17. Hence, the wiring harness 11 fastened with the rotational portion 18 can also rotate in any directions.

The case 17 is divided into two parts, the lower part being a supporter 17a and the upper part being a cover 17b, each having a semispherical receiving space 19 with a circular arc section, and harness lead-outs 20 at both sides. The inner diameter of the receiving spaces 19 is a little larger than that of the rotational portion 18. A wiring harness guide wall 21 is disposed at the wiring harness lead-out 20 and has an outwardly expanding horn shape. The supporter 17a is fixed to a floor, not shown, of the vehicle body with a bracket 22 through a hole 33.

The supporter 17a and the cover 17b are joined and locked each other with locking means, not shown, such as protrusions and frames, and form a spherical receiving space with the each semispherical receiving space 19. The each wiring harness guide wall 21 having a U-shaped section is joined and forms a guide wall having a rectangular section. The rotational portion 18 can rotate 360 degrees in the spherical receiving space 19, the same numeral reference as the receiving space 19 utilized. The rotational portion 18 has an upper and lower semispherical portions 18b and 18a each having a groove 23 to fasten the wiring harness 11. Ridges, not shown, are formed inside the groove 23 to engage with grooves 12a of the corrugated tube 12. The semispherical portions 18a and 18b are locked each other with locking means, not shown, such as flexible locking claws and steps.

The each groove 23 is formed in a semicircle section for the corrugated tube of a circular section and in a semi-oval section for a corrugated tube of an oval section, not shown. In the case of the corrugated tube of the oval section, the grooves of the tube are engaged with the ridges of the rotational portion 18 so that the tube is restrained to rotate around and move to the axial direction. In order to fasten the circular-section corrugated tube 12, an outer diameter of the grooves 12a of the corrugated tube is set larger than an inner diameter of the ridges, not shown, of the rotational portion 18 or a tape, not shown, is wound around the tube so that the tube is restrained to rotate around and move to the axial direction. The plurality of the electric wires 16 can rotate inside the corrugated tube 12 around the axial direction to some extent.

In the case of the electric wires 16 protected with a net tube instead of the corrugated tube, the wiring harness 11 is held with the pair of semispherical portions 18a and 18b so that the wiring harness is fastened with the rotational portion 18. The plurality of the electric wires 16 wound by a vinyl tape are also fastened with the rotational portion 18.

The wiring harness 11 is fastened inside the spherical rotational portion 18, as shown in FIG. 2, and the rotational portion 18 is slidably supported by the case 17 having the cover 17b and the supporter 17a. The rotational portion 18 inside the case 17 rotates in any directions.

The protector 1 is assembled to the sliding door, not shown in FIG. 1. When the sliding door is moved forwardly to close the door, the wiring harness 11 is pulled backwardly along the curved wall 6 and slid along the opening 9 and led out to the vehicle body through a rear end of the opening 9 as shown by a solid line in FIG. 1.

During this operation, the rotational portion 18, fastening the wiring harness, inside the case 17 of the wiring harness fastening device 25 rotates in any directions to absorb twisting and excess bending force of the wiring harness 11.

When the sliding door is opened, the wiring harness 11 moves along the opening 9 as shown by dotted lines and is wound in a small diameter inside the protector 1 and led out to the vehicle body through a fore end of the opening 9. The leaf spring 10 largely bends downwardly with the wiring harness 11 wound in the small diameter and bends in a small diameter along the annular regulating wall 7.

The wiring harness 11 is subjected to a reversed force, or torsion, compared to closing the door. The rotational portion 18 rotates in the reverse direction and absorbs the torsion. At the same time, the rotational portion 18 rotates in the direction of bending of the wiring harness and absorbs the bending force. Accordingly, the wiring harness 11 has an improved endurance for the repetition of closing and opening the sliding door and is prevented from damage with time.

The wiring harness guide wall 21 of the case 17 prevents the wiring harness 11 from bending and deforming so that the wiring harness 11 has an improved endurance.

The protector 1 can be disposed at the vehicle body instead of the sliding door. In this case, the wiring harness fastening device 25 is disposed at the sliding door. The wiring harness fastening device 25 moves back-and-forth with the sliding door and the rotational portion 18 rotates in the sliding and bending directions to absorb the torsion or bending of the wiring harness 11. JP, 2003-341446, A discloses the prior art described above.

The wiring harness fastening device 25 of the present invention further includes the following formation and function.

In order to prevent twisting of the wiring harness 11 when assembling it to the vehicle body, each receiving space 19 in the cover 17 has a rib 26 along the longitudinal direction of the wiring harness 11 and each semispherical portion 18a or 18b has a protrusion 27 to abut to a side wall 26a of the rib 26.

Short circular faces 28 are disposed at both ends of the ribs 26. An outer face of the rotational portion 18 slides on the circular faces 28. Wide recesses 19a are disposed at both sides of the rib 26 to move the protrusions 27 of the rotational portion 18.

The protrusions 27 have a cylindrical shape. The height of the ribs 26 is larger than that of the protrusions 27. The ribs 26 extend straight in the axial direction of the wiring harness fastening device 25. The circular faces 28 have the same curvature as the rotational portion 18 and hold rotatably the rotational portion 18 without clanking. The circular faces 28 are led to the wiring harness lead-out 20.

It is desirable to form surfaces of the ribs 26 flush with the circular faces 28 for making the case 17 a smaller size. In this embodiment, the protrusion 27 is disposed at the lowermost of the semispherical portion 18a and the uppermost of the semispherical portion 18b, respectively. The rib 26 is disposed at an upper portion of the supporter 17a and a lower portion of the cover 17b, respectively. The protrusions 27 and the ribs 26 can be arranged at any places as long as they prevent the wiring harness 11 from twisting when the wiring harness fastening device 25 is assembled to the vehicle body.

The wiring harness guide walls 21 are disposed at a front end of the case 17. The case 17 is fixed to the vehicle body with the bracket 22 with the rotational portion 18 being received in the case 17. The exposed electric wires 16 are fixed with a band to a case extension, not shown, connected to the supporter 17a.

When the wiring harness fastening device 25 is assembled to the vehicle body and the wiring harness 11 is fixed to the case extension, the wiring harness 11 easily twists, especially when the attachment is made while the sliding door fully opened. When the wiring harness 11 is twisted when it is assembled into the vehicle body, the rotational portion 18 rotates, and the protrusions 27 abut to the ribs 26 and prevent the twisting of the wiring harness 11 equal or more than 180 degrees. Accordingly, the torsion on the wiring harness 11, or the electric wires 16 and the corrugated tube 12, is reduced so that the endurance of the wiring harness 11 for the opening and closing of the sliding door is improved.

FIG. 3 shows a side sectional view of an embodiment of a wiring harness fastening device similar to the embodiment shown in FIG. 2 and the same reference numerals are used for the same components.

In FIG. 3, solid lines of the wiring harness 11 and the rotational portion 18 show a state of the sliding door fully closed and dot-dashed lines show the sliding door fully opened.

The wiring harness 12 is fastened to the rotational portion 18 by engaging the grooves 12a of the corrugated tube 11 with ridges 30 of the rotational portion 18. The backwardly extending electric wires 16 are fixed to an extended portion 31 of a case 17' with a band and connected to a wiring harness, not shown, of the vehicle body. In this embodiment, one end 12c of the corrugated tube 12 is placed inside the rotational portion 18 and the other end is led out to the sliding door through a wiring harness guide wall 21.

When the sliding door is fully opened and closed, the wiring harness 11 contacts with the harness guide wall 21, the rotational portion 18 rotates in the case 17' in the direction of A, to which the wiring harness 11 swings, and is rotatably supported by the circular faces 28 of fore and rear circular ribs 34, and the protrusions 27 are positioned close to the ribs 34 without abutting. The rib, reference numeral 26 in FIG. 2, of the axial direction of the wiring harness 11 is located under the wiring harness 11. The case 17' is connected to the wiring harness guide wall 21 through an open space 35.

When the sliding door is fully closed and opened, the protrusions 27 move to the direction of A and also rotates to a circumferential direction of B in the case 17' with the wiring harness 11. When the sliding door is closed strongly, the protrusions 27 abut to the ribs 26 (in FIG. 2) disposed in the axial direction of the case 17' and prevent the wiring harness 11 from twisting. It is reminded that the ribs 26 prevent the wiring harness 11 from twisting when the wiring harness fastening device 25' is assembled in the vehicle body.

When the wiring harness fastening device 25 or 25' is assembled in the vehicle body and the wiring harness 11 is twisted, the protrusions 27 abut to the ribs 26, in FIG. 2, of the axial direction. When the wiring harness 11 is further twisted, a worker feels the reversed torsion of the wiring harness 11 with his hand so that the twisting of equal or more than 180 degrees is prevented and the endurance of the wiring harness 11 is improved.

INDUSTRIAL APPLICABILITY

According to the invention, when the wiring harness fastening device is assembled to the vehicle body and the wiring harness is twisted, the protrusions of the rotational portion abut to the ribs of the case and prevent further twisting. When the wiring harness is further twisted while the protrusions abutting to the ribs, a worker feels the reversed torsion of the wiring harness with his hand and adjusts the twisting when assembling so that the wiring harness after assembly does not have an excess torsion. The endurance of the wiring harness is improved for closing and opening of the sliding door and the reliability for feeding the power current and signals to the auxiliary units in the sliding door is improved.

According to the invention, the rotational portion is held stably with the circular-shaped rib and can rotate smoothly. Thus, when the wiring harness is assembled to the vehicle body, the rotational portion rotates smoothly to absorb the twisting of the wiring harness and assists the protrusions to abut the ribs.

According to the invention, when the sliding door is opened and closed, the wiring harness swings with the rotational portion and is wound along the wiring harness guide walls of the case so that the wiring harness is prevented from bending and the endurance thereof is improved. Thus, the reliability for feeding the power current and signals to the auxiliary units in the sliding door is improved.

According to the invention, when the sliding door is opened and closed strongly, the protrusion of the rotational portion does not hit strongly the rib of the case so that the wear and damage with time of the protrusion and the rib are prevented and the quality with time of the wiring harness fastening device is improved.

According to the invention, when the wiring harness fastening device is assembled to the vehicle body and the wiring harness is twisted, the protrusions of the rotational portion abut to the ribs of the case and prevent further twisting. When the wiring harness is further twisted while the protrusions abutting to the ribs, a worker feels the reversed torsion of the wiring harness with his hand and adjusts the twisting when assembling so that the wiring harness after assembly does not have an excess torsion so that the endurance of the wiring harness is improved for the opening and closing of the sliding door.

The invention claimed is:

1. A wiring harness fastening device for an electric supply line of a sliding door comprising:
   a rotational portion having a spherical shape for fastening the wiring harness to restrain the wiring harness in said rotational portion from rotating around and along an axial direction of the fastened wiring harness; and
   a case having a spherical receiving space for rotatably holding said rotational portion,
   wherein said rotational portion has a pair of protrusions at an outer surface thereof, the rotational portion being rotatable about the axial direction of the fastened wiring harness and in any direction other than the axial direction of the fastened wiring harness,
   wherein said spherical receiving space has a rib, and
   wherein at least one of said protrusions abuts said rib when the wiring harness is twisted and prevents rotation of said rotational portion and the fastened wiring harness about the axial direction of the fastened wiring harness beyond a selected amount which is less than 180°, the selected amount being independent of any rotation of said rotational portion in any direction other than the axial direction of the fastened wiring harness.

2. The wiring harness fastening device as claimed in claim 1, wherein said case has a circular-shaped rib intersecting with the rib for slidably holding the rotational portion.

3. The wiring harness fastening device as claimed in claim 1 or 2, wherein said case has a wiring harness guide wall with a curved shape to lead out the wiring harness.

4. An electric supply unit comprising:
   the wiring harness fastening device, as claimed in claim 1 installed in a vehicle body; and
   a wiring harness protector attached to a sliding door,
   wherein said wiring harness fastened by the wiring harness fastening device is arranged flexibly in the sliding door through an elongated opening of the wiring harness protector.

5. A wiring harness fastening device for an electric supply line of a sliding door comprising:
   a rotational portion having a spherical shape for fastening the wiring harness; and
   a case having a spherical receiving space for rotatably holding the rotational portion,
   wherein said rotational portion has a protrusion at an outer surface thereof,
   wherein said spherical receiving space has a rib,
   wherein said protrusion abuts to the rib when the wiring harness is twisted,
   wherein said case has a wiring harness guide wall with a curved shape to lead out the wiring harness, and
   wherein said wiring harness abuts the wiring harness guide wall prior to the protrusion abutting the rib.

6. An electric supply unit comprising:
   the wiring harness fastening device, as claimed in claim 5, installed in a vehicle body; and
   a wiring harness protector attached to a sliding door,
   wherein said wiring harness fastened by the wiring harness fastening device is arranged flexibly in the sliding door through an elongated opening of the wiring harness protector.

7. A wiring harness fastening device for an electric supply line of a sliding door comprising:
   a rotational portion having a spherical shape for fastening the wiring harness; and
   a case having a spherical receiving space for rotatably holding the rotational portion,
   wherein said rotational portion has a protrusion at an outer surface thereof,
   wherein said spherical receiving space has a rib,
   wherein said protrusion abuts to the rib when the wiring harness is twisted,
   wherein said case has a circular-shaped rib intersecting with the rib for slidably holding the rotational portion,
   wherein said case has a wiring harness guide wall with a curved shape to lead out the wiring harness, and
   wherein said wiring harness abuts the wiring harness guide wall prior to the protrusion abutting the rib.

8. An electric supply unit comprising:
   the wiring harness fastening device, as claimed in claim 7, installed in a vehicle body; and
   a wiring harness protector attached to a sliding door,
   wherein said wiring harness fastened by the wiring harness fastening device is arranged flexibly in the sliding door through an elongated opening of the wiring harness protector.

* * * * *